United States Patent
Chen et al.

(10) Patent No.: US 11,558,301 B2
(45) Date of Patent: Jan. 17, 2023

(54) METHOD, DEVICE, AND COMPUTER PROGRAM PRODUCT FOR ACCESSING APPLICATION SYSTEM

(71) Applicant: EMC IP Holding Company LLC, Hopkinton, MA (US)

(72) Inventors: Rui Chen, Chengdu (CN); Hua Wang, Chengdu (CN); Maoyang Xu, JiangSu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 68 days.

(21) Appl. No.: 17/023,878

(22) Filed: Sep. 17, 2020

(65) Prior Publication Data

US 2021/0297353 A1     Sep. 23, 2021

(30) Foreign Application Priority Data

Mar. 19, 2020   (CN) .......................... 202010198223.9

(51) Int. Cl.
*H04L 12/803*     (2013.01)
*H04L 29/12*     (2006.01)
(Continued)

(52) U.S. Cl.
CPC ........ *H04L 47/122* (2013.01); *H04L 61/5076* (2022.05)

(58) Field of Classification Search
CPC ............... H04L 47/122; H04L 61/2076; H04L 61/2007; H04L 61/2061; H04L 61/1511
See application file for complete search history.

(56) References Cited

U.S. PATENT DOCUMENTS 8,260,974 B1    9/2012   Fredette et al.
9,124,585 B1    9/2015   Yen et al.
(Continued)

FOREIGN PATENT DOCUMENTS

EP     2015236 A1 *   7/2007   ............. G06Q 10/00

OTHER PUBLICATIONS

C. Xie et al., "ARPIM: IP Address Resource Pooling and Intelligent Management System for Broadband IP Networks," in IEEE Communications Magazine, vol. 55, No. 6, pp. 55-61, Jun. 2017, doi: 10.1109/MCOM.2017.1601001. (Year: 2017).*
(Continued)

*Primary Examiner* — Charles C Jiang
*Assistant Examiner* — Biswajit Ghose
(74) *Attorney, Agent, or Firm* — BainwoodHuang (57) ABSTRACT

An available network address is acquired from a network address resource pool associated with the application system according to determination that a workload at a set of network ports of the application system meets a predetermined extension condition, the network address resource pool comprising network addresses configured to be assigned to the application system. A network port available at the application system is selected. A communication channel for accessing the application system is established based on the network address and the network port. According to determination that an access request for accessing the application system is received from an access device, the access request is responded to by using the communication channel. The communication channel provided by the application system to the access device can be dynamically adjusted in real time according to a workload related to data access of the application system.

22 Claims, 8 Drawing Sheets

(51) Int. Cl.
  *H04L 47/122* (2022.01)
  *H04L 61/5076* (2022.01)

(56) References Cited

U.S. PATENT DOCUMENTS

| | | | |
|---|---|---|---|
| 9,378,361 | B1 | 6/2016 | Yen et al. |
| 9,444,744 | B1* | 9/2016 | Sharma ................. H04L 63/101 |
| 10,812,366 | B1* | 10/2020 | Berenberg .......... H04L 41/0806 |
| 2004/0193677 | A1* | 9/2004 | Dar ........................ H04L 67/51 |
| | | | 709/203 |
| 2021/0194830 | A1* | 6/2021 | Sun ....................... H04L 49/555 |

OTHER PUBLICATIONS

C. Xie et al., "ARPIM: IP Address Resource Pooling and Intelligent Management System for Broadband IP Networks," in IEEE Communications Magazine, vol. 55, No. 6, pp. 55-61, Jun. 2017 (Year: 2017).*

* cited by examiner

| Serial number | Network address | Status |
|---|---|---|
| 1 | ADD-001 | Unavailable |
| 2 | ADD-002 | Available |
| ... | ... | ... |
| N | ADD-00N | Available |

| Serial number | Network address | Status |
|---|---|---|
| 1 | ADD-001 | Unavailable |
| 2 | ADD-002 | Unavailable |
| ... | ... | ... |
| N | ADD-00N | Available |

| Serial number | Domain name of application system | Network address |
|---|---|---|
| 1 | NAME1 | ADD-001 |
| 2 | NAME1 | ADD-002 |

METHOD, DEVICE, AND COMPUTER PROGRAM PRODUCT FOR ACCESSING APPLICATION SYSTEM

CROSS-REFERENCE TO RELATED APPLICATION

This application claims priority to Chinese Patent Application No. CN202010198223.9, on file at the China National Intellectual Property Administration (CNIPA), having a filing date of Mar. 19, 2020, and having "METHOD, DEVICE, AND COMPUTER PROGRAM PRODUCT FOR ACCESSING APPLICATION SYSTEM" as a title, the contents and teachings of which are herein incorporated by reference in their entirety.

TECHNICAL FIELD

Various implementations of the present disclosure relate to management of application systems, and in particular, to a method, a device, and a computer program product for accessing an application system.

BACKGROUND

With the development of computer technologies and network technologies, a variety of application systems have emerged at present. For example, in an application system that provides storage services, users can store data to and/or retrieve data from the application system. In an application system that provides computing services, users can provide input data to the application system and retrieve computing results. When a large number of users access an application system, the bandwidth available to each user will be reduced, which leads to a decrease in a data transmission speed and a longer waiting time for the users. In this case, how to access the application system more effectively has become a hot topic of research.

SUMMARY OF THE INVENTION

Therefore, it is expected that a technical solution for accessing an application system more effectively can be developed and implemented. It is expected that the technical solution is compatible with existing application systems and accesses the application systems more effectively by modifying various configurations of the existing application systems.

According to a first aspect of the present disclosure, a method for accessing an application system is provided. In the method, an available network address is acquired from a network address resource pool associated with the application system according to determination that a workload at a set of network ports of the application system meets a predetermined extension condition, the network address resource pool comprising network addresses configured to be assigned to the application system. A network port available at the application system is selected. A communication channel for accessing the application system is established based on the network address and the network port. According to determination that an access request for accessing the application system is received from an access device, the access request is responded to by using the communication channel.

According to a second aspect of the present disclosure, an electronic device is provided, comprising: at least one processor; and a memory coupled to the at least one processor and having instructions stored therein, wherein when executed by the at least one processor, the instructions cause the device to perform actions for accessing an application system performed in the application system. The actions comprise: acquiring an available network address from a network address resource pool associated with the application system according to determination that a workload at a set of network ports of the application system meets a predetermined extension condition, the network address resource pool comprising network addresses configured to be assigned to the application system; selecting a network port available at the application system; establishing, based on the network address and the network port, a communication channel for accessing the application system; and responding to, according to determination that an access request for accessing the application system is received from an access device, the access request by using the communication channel.

According to a third aspect of the present disclosure, a computer program product is provided. The computer program product is tangibly stored in a non-volatile computer-readable medium and comprises machine-executable instructions that are configured to perform the method according to the first aspect of the present disclosure.

DESCRIPTION OF THE DRAWINGS

The features, advantages, and other aspects of the implementations of the present disclosure will become more obvious with reference to the accompanying drawings and the following detailed descriptions. Several implementations of the present disclosure are illustrated herein in an exemplary rather than restrictive manner. In the drawings, FIG. 1 schematically illustrates a block diagram of a process of accessing an application system by an access device according to a technical solution.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more details below with reference to the accompanying drawings. Although the preferred implementations of the present disclosure are shown in the accompanying drawings, it should be appreciated that the present disclosure can be implemented in various forms and should not be limited by the implementations described here. In contrast, the implementations are provided to make the present disclosure more thorough and complete, and the scope of the present disclosure can be fully conveyed to those skilled in the art.

The term "include" and its variants as used herein indicate open inclusion, i.e., "including, but not limited to." Unless specifically stated otherwise, the term "or" indicates "and/or." The term "based on" indicates "based at least in part on." The terms "an example implementation" and "an implementation" indicate "at least one example implementation." The term "another implementation" indicates "at least one additional implementation." The terms "first," "second," and the like may refer to different or identical objects. Other explicit and implicit definitions may also be included below.

Figure 1:
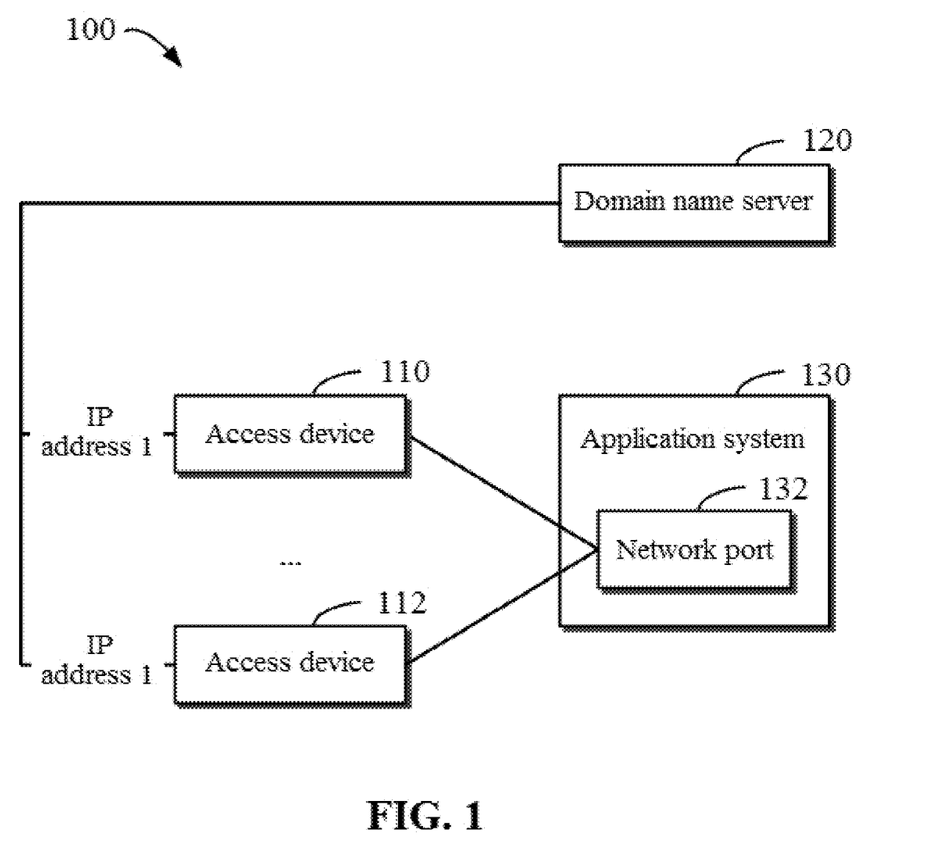

An application environment of an example implementation of the present disclosure is described first with reference to FIG. 1. FIG. 1 schematically illustrates block diagram 100 of a process of accessing an application system by an access device according to a technical solution. As shown in FIG. 1, access devices 110, . . . , and 112 can access data in the application system. Specifically, access device 110 can access the application system based on a domain name of application system 130. In this case, the domain name is first sent to domain name server 120. Access device 110 can be connected to network port 132 of application system 130 via IP address 1 returned from domain name server 120 and then access application system 130. Similarly, access device 112 accesses application system 130 via IP address 1 returned from domain name server 120.

When the traffic for application system 130 increases, due to limitations of physical resources of network port 132, bandwidths assigned to a plurality of access devices 110, . . . , and 112 will be reduced. This results in a slower access speed and a longer waiting time of the access devices. A technical solution of pre-assigning a plurality of network ports at application system 130 to service access requests has been proposed at present. However, in the technical solution, configuration information is required to be preset in application system 130 and domain name server 120. In this case, the bandwidth provided by application system 130 is fixed, and cannot be dynamically adjusted with a change in the traffic.

In order to address at least part of the above problems and one or more of other potential problems, a technical solution for accessing an application system is proposed in an example implementation of the present disclosure. According to an example implementation of the present disclosure, a network address resource pool may be provided, which may include network addresses configured to be assigned to application system 130. When an access load of application system 130 is high, an available network address may be selected from the network address resource pool and a new communication channel may be created. When the access load of the application system is reduced, the communication channel may be released, and the network address related to the communication channel may be returned to the network address resource pool. As such, the communication channel provided by application system 130 to the access device can be dynamically adjusted in real time according to the access load of the application system, thereby improving the access speed.

Figure 2:
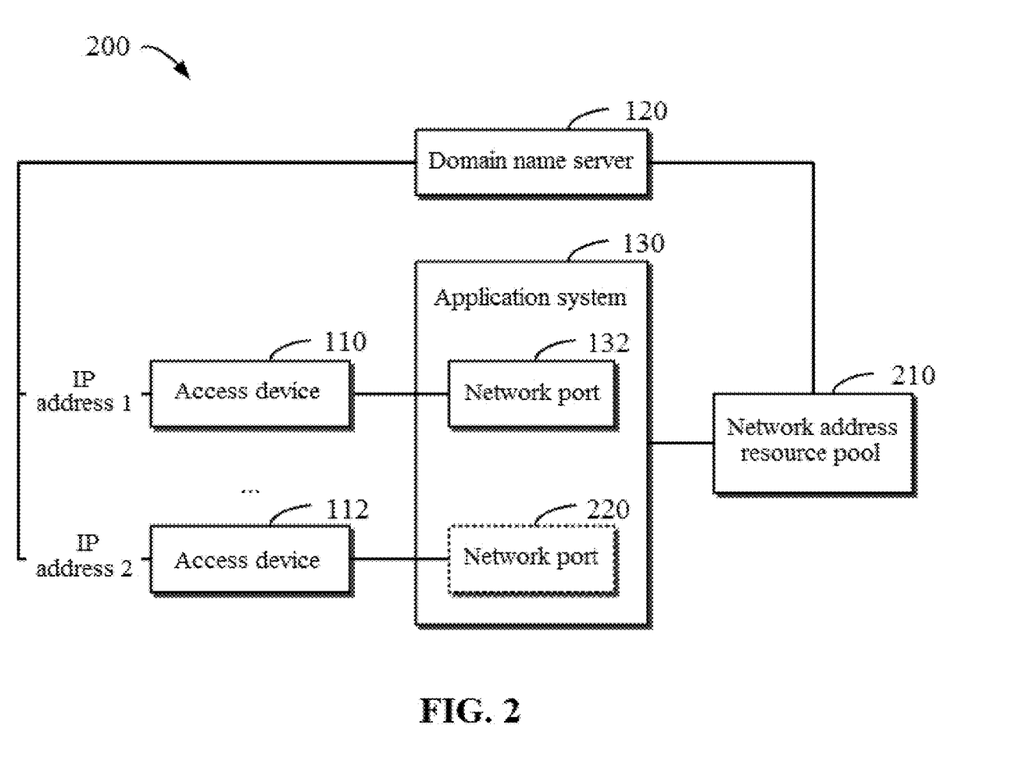
FIG. 2 schematically illustrates a block diagram of a process for accessing an application system according to an example implementation of the present disclosure.

In the following, an overview of an example implementation of the present disclosure is described first with reference to FIG. 2. FIG. 2 schematically illustrates block diagram 200 of a process for accessing application system 130 according to an example implementation of the present disclosure. Network address resource pool 210 may include network addresses configured to be assigned to application system 130. When an access load of application system 130 is increased, an available network address (such as IP address 2) can be selected from network address resource pool 210. Further, a new communication channel can be established based on network port 220 and IP address 2 in application system 130. In this case, when access device 112 accesses application system 130, access device 112 can access network port 220 using IP address 2.

In this case, application system 130 can provide a plurality of network ports 132 and 220, and a plurality of access devices can access application system 130 via IP address 1 and IP address 2, respectively. A transmission bandwidth of application system 130 is increased by network port 220, and therefore, transmission bandwidths assigned to various access devices can be increased, thus increasing the access speed.

According to an example implementation of the present disclosure, a workload related to data access at application system 130 can be dynamically monitored. Specifically, when the workload is high, the quantity of ports of application system 130 that provide access services externally can be increased. As such, workloads of existing communication ports can be reduced, and access requests can be served with a higher transmission bandwidth.

Figure 3:
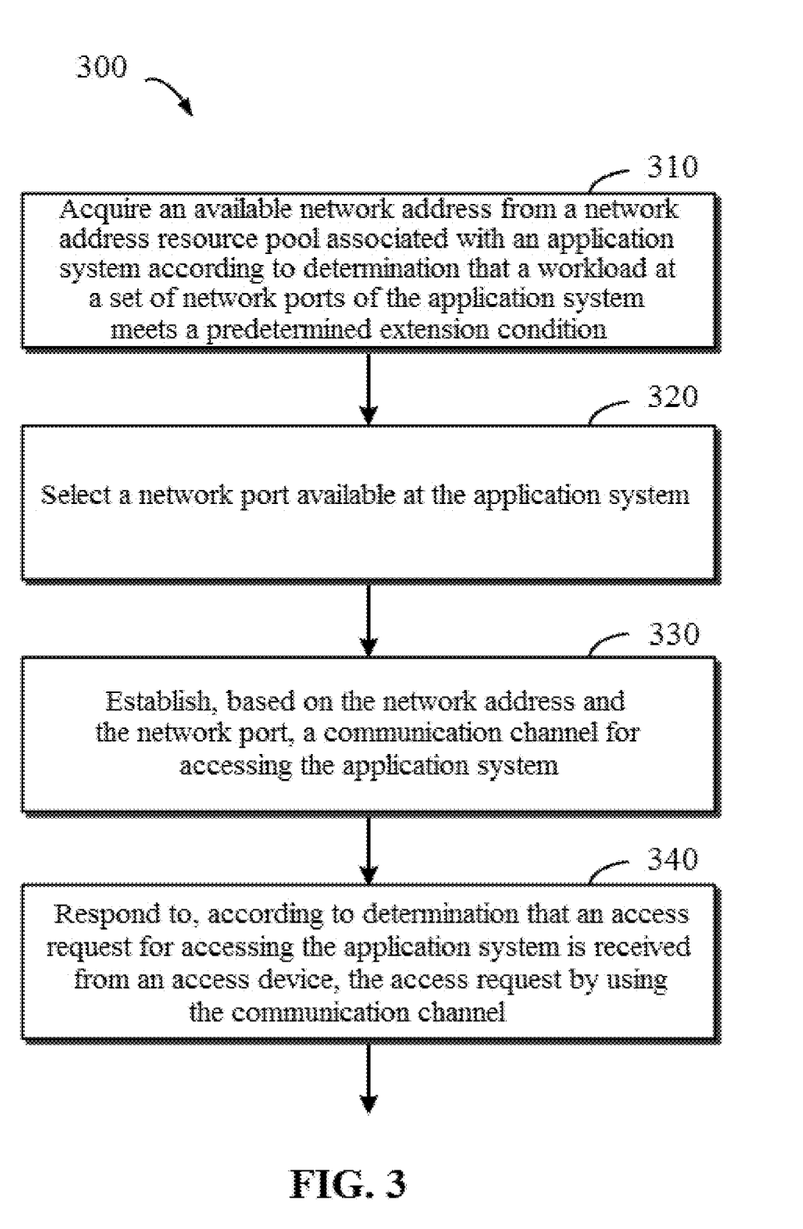
FIG. 3 schematically illustrates a flowchart of a method for accessing an application system according to an example implementation of the present disclosure.

In the following, more details of an example implementation of the present disclosure will be described with reference to FIG. 3. FIG. 3 schematically illustrates a flowchart of method 300 for accessing application system 130 according to an example implementation of the present disclosure. In block 310, an available network address is acquired from network address resource pool 210 associated with application system 130 according to determination that a workload at a set of network ports of application system 130 meets a predetermined extension condition. It will be appreciated that the set of network ports here refer to one or more network ports that provide access services to access devices. Only one network port can be provided in an initial stage of operation of application system 130. As application system 130 operates and more access devices access application system 130, the quantity of network ports can be increased by performing method 300 of the present disclosure.

The workload here may include contents of many aspects. For example, the workload can be determined based on a bandwidth being used at a set of ports of application system 130, based on the quantity of access devices accessing application system 130, based on a data transmission volume related to each access device, or the like. The extension condition may be set based on one or more of the above aspects. For example, a threshold may be set for the bandwidth, and if a bandwidth required by a current access is higher than an upper limit of the predetermined threshold, an available network address is acquired from network address resource pool 210.

Figure 4A:
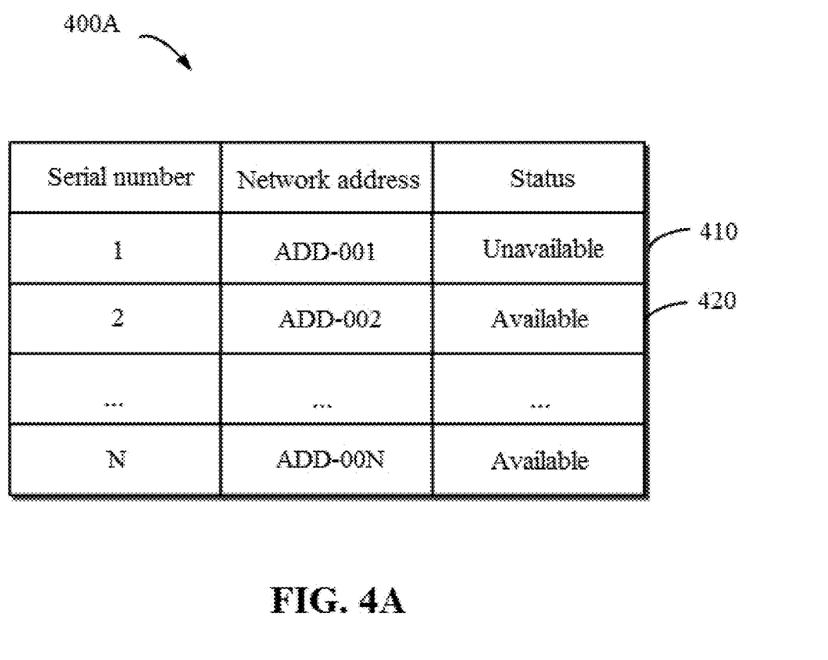
FIG. 4A and FIG. 4B schematically illustrate a block diagram of a data structure for storing network addresses in a network address resource pool according to an example implementation of the present disclosure, respectively.

Network address resource pool 210 here includes network addresses configured to be assigned to application system 130. In the following, more details of network address resource pool 210 will be described with reference to FIG. 4A and FIG. 4B. FIG. 4A schematically illustrates block diagram 400A of a data structure for storing network addresses in network address resource pool 210 according to an example implementation of the present disclosure. Serial numbers of the network addresses are shown in the first column of block diagram 400A, values of the network addresses are shown in the second column, and statuses of the network addresses are shown in the third column.

A plurality of network addresses ADD-001 to ADD-00N can be provided. At the initial stage of operation of application system 130, the access devices are only allowed to access application system 130 using network address ADD-001, and the statuses of the network addresses are as shown in FIG. 4A. In this case, the status of network address ADD-001 shown in entry 410 is "unavailable" (indicating that the address has been occupied), while the statuses of network address ADD-002 shown in entry 420 and other network addresses are all "available" (indicating that the addresses have not yet been occupied).

Figure 4B:
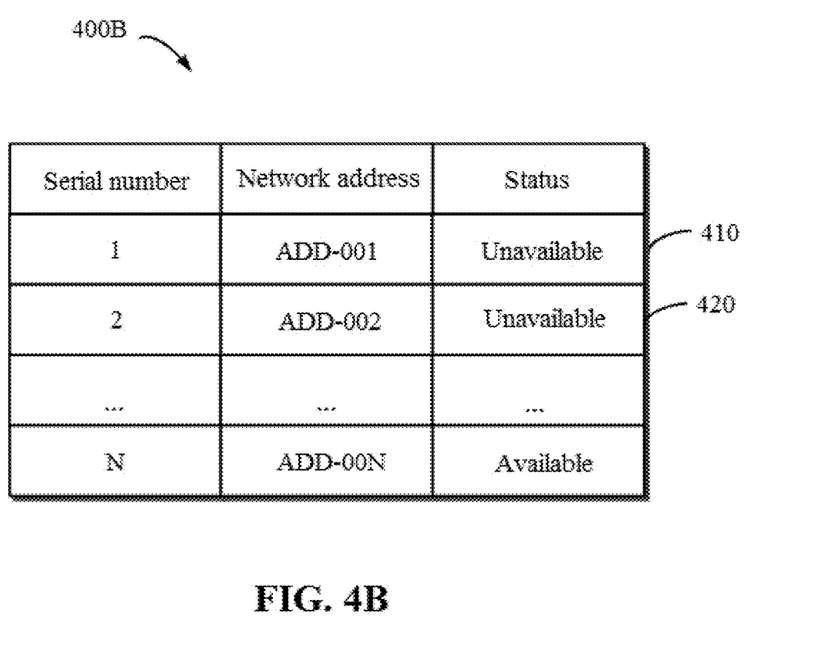

According to an example implementation of the present disclosure, after a network address has been selected from network address resource pool 210, the status of the network address can be marked as "unavailable." Referring to FIG. 4A, if network address ADD-002 is selected, the status of network address ADD-002 shown in entry 420 will be changed to "unavailable" as shown in FIG. 4B. By setting status identifiers, which network addresses have been used and which network addresses have not yet been used can be clearly indicated, so that an available network address can be selected in the subsequent operation to establish a new communication channel.

Referring back to block 320 in FIG. 3, an available network port at application system 130 can be selected. It will be appreciated that application system 130 may include a plurality of network ports, and an idle network port can be selected. Alternatively and/or additionally, a network port with a low workload can also be selected from the plurality of network ports of application system 130. It will be appreciated that a network port is selected for providing a transmission service to an access device, and therefore, the selection of an idle network port and/or a network port with a low workload can provide a higher transmission bandwidth, thus providing a faster access speed for the access device.

Figure 5:
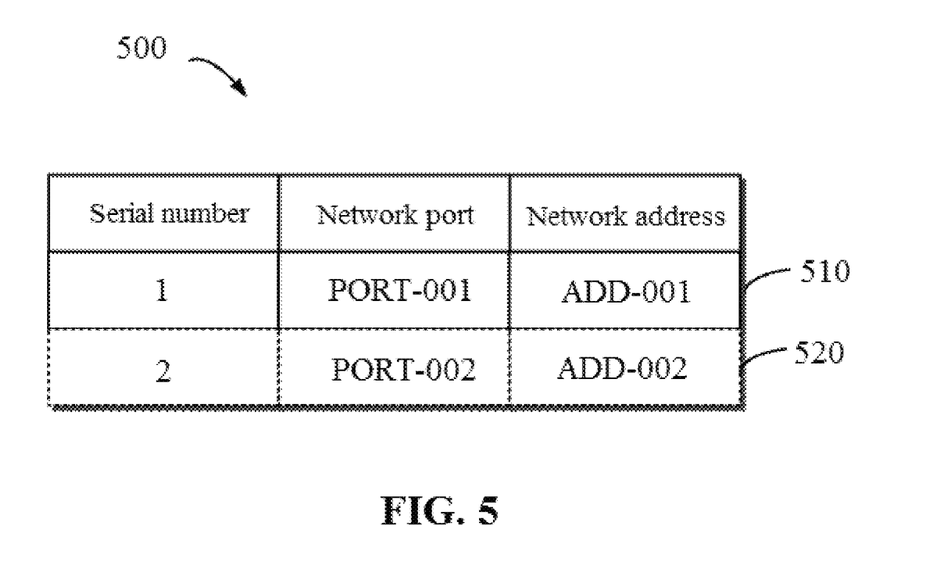
FIG. 5 schematically illustrates a block diagram of associations between network ports and network addresses according to an example implementation of the present disclosure.

In block 330, a communication channel for accessing application system 130 can be established based on the selected network address and network port. In the following, how to establish a communication channel will be described with reference to FIG. 5. FIG. 5 schematically illustrates block diagram 500 of associations between network ports and network addresses according to an example implementation of the present disclosure. An existing communication channel is shown in entry 510 illustrated with a solid box in FIG. 5. In the communication channel, network address ADD-001 is assigned to network port PORT-001. In this case, an access device can be connected to network port PORT-001 in application system 130 via network address ADD-001 and then access data in application system 130. Network address ADD-002 can be assigned to network port PORT-002 for establishing a communication channel. In this case, entry 520 shown with a dashed box will be added to block diagram 500, and application system 130 has two communication channels to serve the access device.

Figure 6:
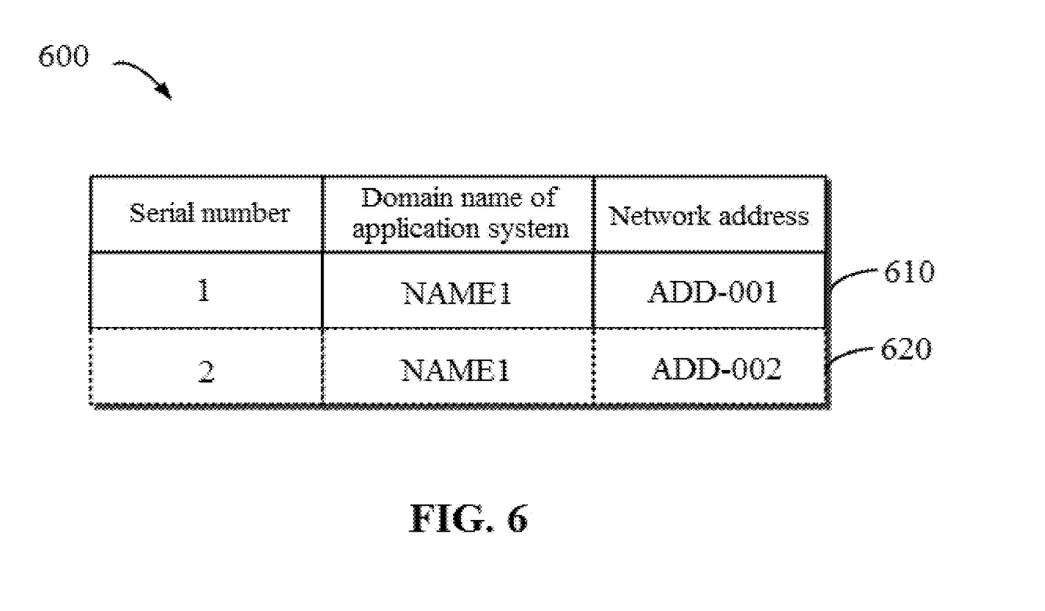
FIG. 6 schematically illustrates a block diagram of associations between a domain name of an application system and network addresses according to an example implementation of the present disclosure.

According to an example implementation of the present disclosure, to enable an access device that is expected to access application system 130 to know the newly established communication channel, domain name server 120 associated with application system 130 can be notified to establish an association between application system 130 and the network address. FIG. 6 schematically illustrates a block diagram of association 600 between a domain name of application system 130 and network addresses according to an example implementation of the present disclosure. Serial numbers of associations are shown in the first column of FIG. 6, the domain name of application system 130 is shown in the second column, and network addresses that can be configured to access application system 130 are shown in the third column. Association 600 can cause the access request from the access device that is expected to access application system 130 to be directed to the communication channel recorded by association 600.

Entry 610 illustrated with a solid box in association 600 indicates an original association in domain name server 120. When the access device is expected to access application system 130, the access device can be directed to network address ADD-001 based on the association in entry 610. Next, new entry 620 illustrated with a dashed box can be added to association 600 based on the manner described above. In this case, when another access device is expected to access application system 130, the access device can be directed to network address ADD-002 based on the association in entry 620. As such, the access device can access application system 130 via the newly established communication channel.

According to an example implementation of the present disclosure, domain name server 120 can be instructed to direct an access request from the access device by polling. For example, an access request from a first access device can be directed to a communication channel having network address ADD-001, an access request from a second access device can be directed to a communication channel having network address ADD-002, an access request from a third access device can be directed to the communication channel having network address ADD-001, and the rest may be deduced by analogy. Alternatively and/or additionally, an access request can be directed randomly or in other manners. According to an example implementation of the present disclosure, the quantity of the communication channels can be dynamically adjusted based on a workload related to access of application system 130, thereby increasing a response speed of the access request.

Referring back to block 340 of FIG. 3, according to determination that an access request for accessing application system 130 is received from an access device, the access request is responded to by using the established communication channel. In this case, when an access device accesses application system 130, the access device will be automatically directed to a newly established communication channel.

By using method 300 described above, newly added network port PORT-002 and original network port PORT-001 are used together to receive an access from one or more access devices. In this case, network port PORT-002 can be added to a set of original network ports that provide access services. In this case, the set of network ports that provide access services may include network ports PORT-001 and PORT-002. With changes in the workload of data access at application system 130, the set of network ports may further include more network ports.

According to an example implementation of the present disclosure, method 300 is transparent to the access device and can be implemented at application system 130. Only a management module for implementing method 300 needs to be deployed at application system 130, so that the management module notifies domain name server 120 to update association 600 when necessary. In other words, according to an example implementation of the present disclosure, functions of the access device and domain name server 120 do not need to be modified. Domain name server 120 can update association 600 based on an existing function after a notification of updating association 600 is received, and a new access request from the access device can be directed to the established communication channel.

The schematic implementation of relieving communication pressure on application system 130 by creating a new communication channel when the workload at a set of network ports of application system 130 is too high has been described above. It will be appreciated that the workload related to data access between application system 130 and the access devices may be changed, and when the workload is reduced, the quantity of network ports of application system 130 that provide access services can be reduced to avoid a waste of network ports and network addresses.

According to an example implementation of the present disclosure, the workload related to access to application system 130 can be judged based on a contraction condition. Similar to the extension condition described above, the contraction condition may also cover contents in many aspects. For example, the contraction condition may be set based on one or more of a usage bandwidth, the quantity of access devices accessing application system 130, a data transmission volume, and so on. For example, a lower threshold limit may be set for the bandwidth, and if a bandwidth required by a current access is lower than the predetermined lower threshold limit, the quantity of the communication channels that provide access services can be reduced.

According to an example implementation of the present disclosure, a network address can be selected from a set of network addresses assigned to the set of network ports. A network address to be retrieved can be selected in a variety of manners. For example, a network address can be selected randomly. Alternatively and/or additionally, a network address that has been recently used to create a communication channel can also be selected from network address resource pool 210. It will be appreciated that there is a one-to-one correspondence between network addresses and network ports, and therefore, a network port can be selected from the set of network ports first and then a network address assigned to the network port is selected.

On the assumption that network address ADD-002 has been selected, the communication channel associated with the network address can be released. Specifically, domain name server 120 can be notified to disassociate application system 130 from selected network address ADD-002. Referring to FIG. 6, the association shown in entry 620 can be removed from the association 600 shown in FIG. 6.

Based on the method described above, after the association between application system 130 and network address ADD-002 has been removed, only the association between application system 130 and network address ADD-001 exists in domain name server 120. When the access device makes a request for accessing application system 130, the access device will return network address ADD-001 to the access device. According to an example implementation of the present disclosure, access to application system 130 can be managed conveniently and effectively.

It will be appreciated that although a new access request will be directed to network address ADD-001, the performance of an access request from the access device previously directed to network address ADD-002 can be continued, that is, access to application system 130 can be continued by using network port PORT-002. According to an example implementation of the present disclosure, when to release network port PORT-002 can be determined based on that the release of an access load at the network port PORT-002 meets a predetermined release condition. For example, the network port can be released upon determination that the access operation has been completed. For another example, the network port can be released upon determination that the access operation is interrupted or another failure occurs. As such, on the one hand, the access to application system 130 can be ensured to continue via the communication channel, and on the other hand, the access operation can be completed or, if necessary otherwise, the network port can be released for other functions.

According to an example implementation of the present disclosure, after the selected network address has been removed from a list of domain name server 120 and the associated network port has been released, the status of the network address can be marked as available. On the assumption that network address "ADD-002" has been removed from domain name server 120 and network port "PORT-002" has been released, the status of the network address in entry 420 in a list of statuses of network addresses as shown in FIG. 4B will be changed from "unavailable" to "available." In this case, the network address in network address resource pool 210 and having the status "available" can be used to create a communication channel once again when an access workload of application system 130 is high.

Although it is only schematically illustrated above that one network port is selected from a set of network ports and the corresponding communication channel is released, more communication channels can be released when the access workload of application system 130 is reduced significantly. According to an example implementation of the present disclosure, the quantity of communication channels expected to be retained can be determined based on the access workload of application system 130. Then, one or more communication channels can be released based on a difference between the current quantity of channels and the determined quantity.

According to an example implementation of the present disclosure, for the access device accessing application system 130, a connection between the access device and application system 130 can be adjusted also based on whether a predetermined migration condition is met. Referring back to FIG. 2, on the assumption that access device 110 has been connected to network port 132 and assigned with a too low bandwidth, in this case, access device 110 can be notified to access application system 130 via the newly established communication channel. Specifically, access device 110 can be notified to be connected to network port PORT-002 via network address ADD-002. Since the workload of network port PORT-002 is low, the bandwidth assigned to access device 110 can be increased accordingly, thereby providing a data access speed. According to an example implementation of the present disclosure, an access device can be actively connected to the newly established communication channel when it is found that a bandwidth assigned to the access device is too low. As such, access to application system 130 at a low speed via the original network address can be avoided.

How to dynamically adjust the access to application system 130 has been described above. It will be appreciated that application system 130 here may include a storage system, a computing system, or an application system for achieving another objective. In the following, more details about the example implementation of the present disclosure will be described in the context of the storage system.

Figure 7A:
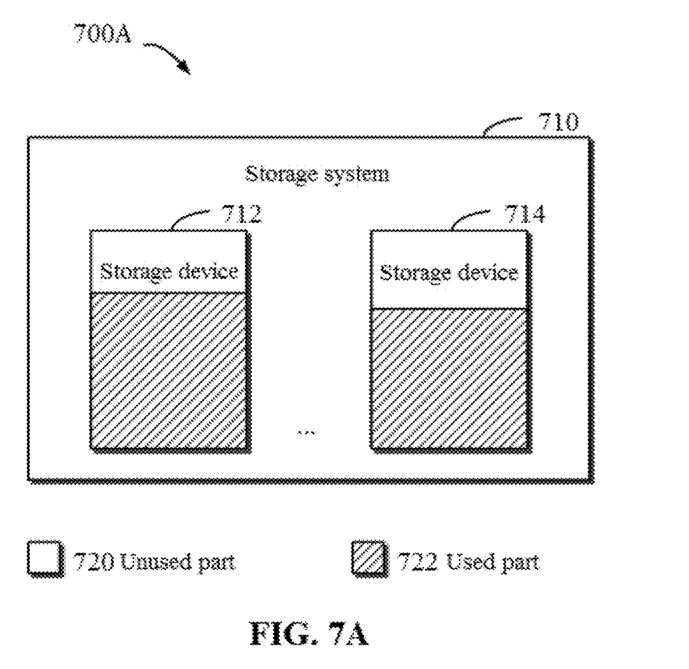
FIG. 7A schematically illustrates a block diagram of a process of creating a communication channel based on a service load of a storage space in an application system according to an example implementation of the present disclosure.

It will be appreciated that users can request assignment of a storage space from the storage system. In an initial stage, the storage system may have only a small number of users, and only a small amount of storage space is assigned to these users. With the operation of the storage system, increasingly more users will request a storage space from the storage system, and the storage space in the storage system will be used gradually in this case. FIG. 7A schematically illustrates block diagram 700A of a process of creating a communication channel based on a service load of a storage space in an application system according to an example implementation of the present disclosure. In FIG. 7, storage system 710 may include a plurality of storage devices 712, . . . , and 714, wherein legend 720 represents an unused part and legend 722 represents a used part.

In general, the traffic for storage system 710 will be increased with an increase in the service load of the storage space in storage system 710. According to an example implementation of the present disclosure, if it is determined that the service load of storage system 710 meets a predetermined service condition, a new communication channel can be established in advance to avoid excessive simultaneous access requests and consequent network congestion. Specifically, an available network address (e.g., ADD-003) can be acquired from network address resource pool 210 based on method 300 described above, another network port (e.g., PORT-003) available at storage system 710 can be selected, and another network address can be assigned to another network port for establishing another communication channel for accessing storage system 710. According to an example implementation of the present disclosure, the communication channel can be established before actual network congestion, thereby further alleviating the problem of an insufficient available bandwidth.

Figure 7B:
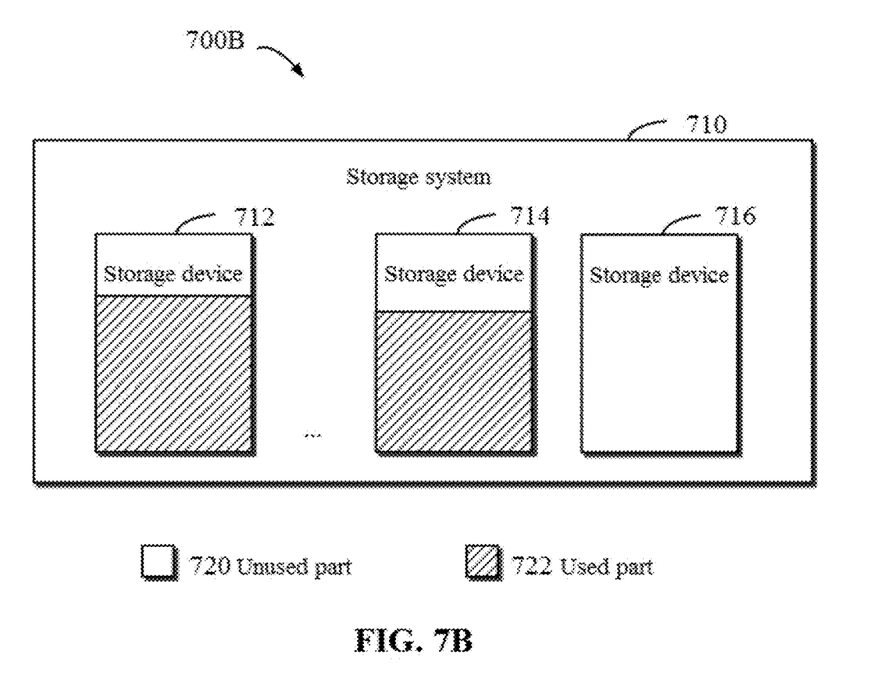
FIG. 7B schematically illustrates a block diagram of a process of creating a communication channel based on extension of a storage space in an application system according to an example implementation of the present disclosure.

It will be appreciated that with the operation of storage system 710, the storage capacity in existing storage devices 712, . . . , and 714 may be insufficient to meet the requirements, in which case the storage space of storage system 710 needs to be extended. FIG. 7B schematically illustrates block diagram 700B of a process of creating a communication channel based on extension of a storage space in an application system according to an example implementation of the present disclosure. New storage device 716 can be added to storage system 710. In general, the addition of the new storage device means extension of the storage space of storage system 710, and then more access requests may be generated. Thus, a new communication channel can be established in advance to avoid excessive simultaneous access requests and consequent network congestion. Specifically, based on method 300 described above, a network address and a network port can be acquired and anew communication channel can be established. As such, a transmission bandwidth provided by the storage system to an access device can be dynamically adjusted according to a potential workload that may occur in the storage system.

Examples of the method according to the present disclosure have been described above in detail with reference to FIG. 2 to FIG. 7B, and implementation of a corresponding apparatus will be described in the following. According to an example implementation of the present disclosure, an apparatus for accessing an application system is provided. The apparatus includes: an acquisition module configured to acquire an available network address from a network address resource pool associated with the application system according to determination that a workload at a set of network ports of the application system meets a predetermined extension condition, the network address resource pool comprising network addresses configured to be assigned to the application system; a selection module configured to select a network port available at the application system; an establishing module configured to establish, based on the network address and the network port, a communication channel for accessing the application system; and a responding module configured to respond to, according to determination that an access request for accessing the application system is received from an access device, the access request by using the communication channel. According to an example implementation of the present disclosure, the apparatus may further include corresponding modules for performing various steps in method 300.

Figure 8:
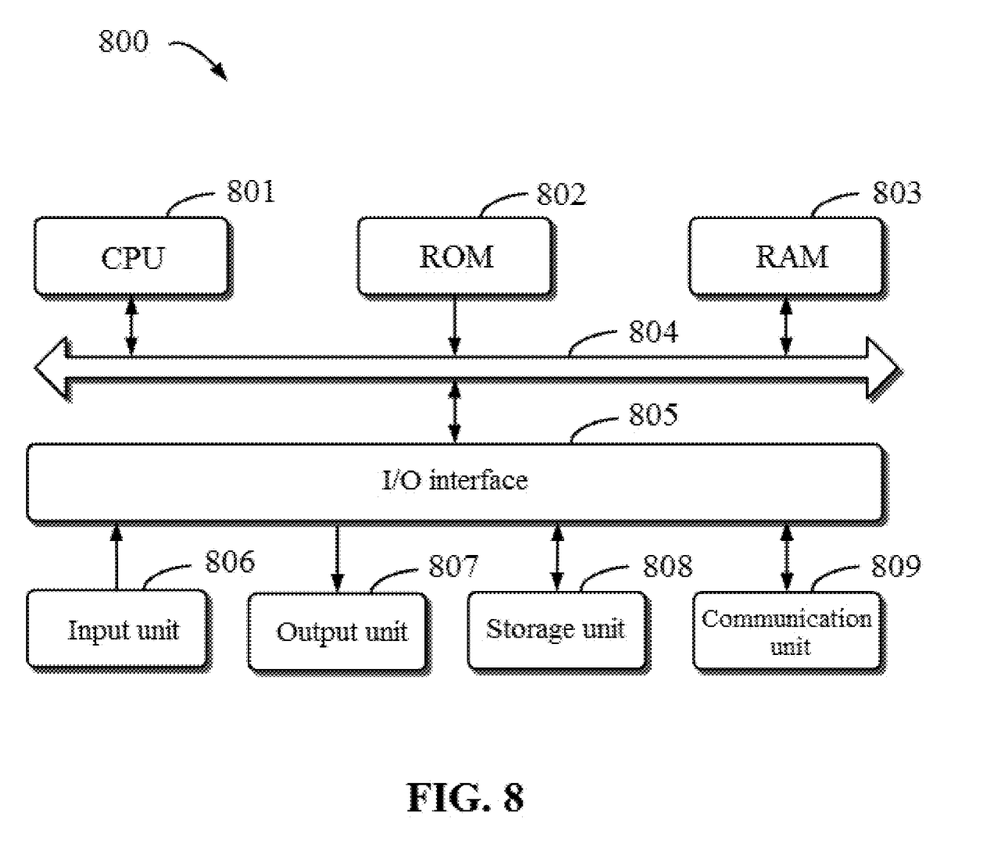
FIG. 8 schematically illustrates a block diagram of a device for accessing an application system according to an example implementation of the present disclosure.

FIG. 8 schematically illustrates a block diagram of device 800 for performing operations in an application system according to an example implementation of the present disclosure. As shown in the figure, device 800 includes general processing unit (CPU) 801 that can perform various appropriate actions and processing according to computer program instructions stored in read-only memory (ROM) 802 or computer program instructions loaded from storage unit 808 to random access memory (RAM) 803. Various programs and data required for the operation of device 800 can also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices over a computer network such as the Internet and/or various telecommunication networks.

The various processes and processing described above, for example, method 300, may be performed by processing unit 801. For example, in some implementations, method 300 can be implemented as a computer software program that is tangibly included in a machine-readable medium such as storage unit 808. In some implementations, some or all of the computer programs can be loaded and/or installed onto device 800 via ROM 802 and/or communication unit 809. When the computer program is loaded into RAM 803 and executed by CPU 801, one or more steps of method 300 described above may be implemented. Alternatively, in other implementations, CPU 801 may also be configured to implement the above process/method in any other suitable manners.

According to an example implementation of the present disclosure, an electronic device is provided, including: at least one processor; and a memory coupled to the at least one processor and having instructions stored therein, wherein when executed by the at least one processor, the instructions cause the device to perform actions for accessing an application system performed in the application system. The actions comprise: acquiring an available network address from a network address resource pool associated with the application system according to determination that a workload at a set of network ports of the application system meets a predetermined extension condition, the network address resource pool comprising network addresses configured to be assigned to the application system; selecting a network port available at the application system; establishing, based on the network address and the network port, a communication channel for accessing the application system; and responding to, according to determination that an access request for accessing the application system is received from an access device, the access request by using the communication channel.

According to an example implementation of the present disclosure, establishing, based on the network address and the network port, the communication channel for accessing the application system includes: assigning the network address to the network port for establishing the communication channel; and notifying a domain name server associated with the application system to establish an association between the application system and the network address, so that the access request from the access device that is expected to access the application system is directed to the communication channel.

According to an example implementation of the present disclosure, the actions further include: marking a status of the network address as unavailable.

According to an example implementation of the present disclosure, the actions further include: adding the network port to the set of network ports; selecting, according to determination that the access load at the set of network ports meets a predetermined contraction condition, a network address from a set of network addresses assigned to the set of network ports; and notifying the domain name server to disassociate the application system from the selected network address.

According to an example implementation of the present disclosure, the actions further include: marking a status of the selected network address as available.

According to an example implementation of the present disclosure, the actions further include: releasing the network port according to determination that an access load at the network port to which the selected network address is assigned meets a predetermined release condition.

According to an example implementation of the present disclosure, selecting the network port available at the application system includes: selecting a network port with a low workload from a plurality of network ports of the application system.

According to an example implementation of the present disclosure, the actions further include: instructing, according to determination that an available bandwidth of the access device accessing the application system meets a predetermined migration condition, the access device to access the application system via the communication channel.

According to an example implementation of the present disclosure, the application system includes a storage system, and the actions further include: according to determination that a service load of the storage system meets a predetermined service condition, acquiring another available network address from the network address resource pool; selecting another network port available at the storage system; and assigning the another network address to the another network port for establishing another communication channel for accessing the application system.

According to an example implementation of the present disclosure, the application system includes a storage system, and the actions further include: according to determination that a service load of the storage system meets a predetermined service condition, acquiring another available network address from the network address resource pool; selecting another network port available at the storage system; and assigning the another network address to the another network port for establishing another communication channel for accessing the application system.

According to an example implementation of the present disclosure, a computer program product is provided. The computer program product is tangibly stored in a non-volatile computer-readable medium and includes machine-executable instructions that are configured to perform the method according to the present disclosure.

According to an example implementation of the present disclosure, a computer-readable medium is provided. Machine-executable instructions are stored on the computer-readable medium, and when executed by at least one processor, the machine-executable instructions cause the at least one processor to implement the method according to the present disclosure.

The present disclosure may be a method, a device, a system, and/or a computer program product. The computer program product may include a computer-readable storage medium storing computer-readable program instructions for performing various aspects of the present disclosure.

The computer-readable storage medium can be a tangible device capable of retaining and storing instructions used by an instruction-executing device. For example, the computer-readable storage medium can be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used herein is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer can be connected to a user computer over any kind of networks, including a local area network (LAN) or wide area network (WAN), or can be connected to an external computer (e.g., connected over the Internet using an Internet service provider). In some implementations, an electronic circuit, such as a programmable logic circuit, a field programmable gate array (FPGA), or a programmable logic array (PLA), can be customized by utilizing state information of the computer-readable program instructions. The computer-readable program instructions are executable by the electronic circuit to implement various aspects of the present disclosure.

Various aspects of the present disclosure are described here with reference to flowcharts and/or block diagrams of the method, the apparatus (system), and the computer program product implemented according to the present disclosure. It should be appreciated that each block in the flowcharts and/or block diagrams and a combination of blocks in the flowcharts and/or block diagrams can be implemented by computer program instructions.

The computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium, and the instructions cause the computer, another programmable data processing apparatus, and/or other devices to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams can represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they can be performed in an opposite order sometimes, depending on the functions involved. It also should be noted that each block in the block diagrams and/or flowcharts, and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above, and the foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations, or technical improvements of technologies on the market, or to enable other persons of ordinary skill in the art to understand the implementations disclosed here.

The invention claimed is:

1. A method for accessing an application system, wherein the application system is a storage system that contains a plurality of storage devices and that provides storage services, comprising:

acquiring an available network address from a network address resource pool associated with the application system in response to a determination that a workload received at a set of network ports in the application system exceeds a threshold, wherein the set of network ports receives storage access requests directly from a plurality of access devices and provides the storage services from the application system to the plurality of access devices, wherein the workload received at the set of network ports comprises a quantity of the plurality of access devices, and wherein the network address resource pool comprises network addresses configured to be assigned to the application system;

selecting a network port available in the application system;

establishing, by the application system based on the network address and the network port, a communication channel for accessing the application system, wherein the communication channel is provided by the application system to an access device for the access device to connect directly to the application system using the network address and the network port; and responding to, according to determination that an access request for accessing the application system is received by the application system from the access device, the access request by using the communication channel.

2. The method of claim 1, wherein establishing, based on the network address and the network port, the communication channel for accessing the application system comprises:

assigning the network address to the network port for establishing the communication channel; and notifying a domain name server associated with the application system to establish an association between the application system and the network address, so that the access request from the access device that is expected to access the application system is directed to the communication channel.

3. The method of claim 1, further comprising: marking a status of the network address as unavailable.

4. The method of claim 3, further comprising:

adding the network port to the set of network ports;

selecting, according to determination that the access load at the set of network ports meets a predetermined contraction condition, a network address from a set of network addresses assigned to the set of network ports; and notifying the domain name server to disassociate the application system from the selected network address.

5. The method of claim 4, further comprising: marking a status of the selected network address as available.

6. The method of claim 4, further comprising: releasing the network port according to determination that an access load at the network port to which the selected network address is assigned meets a predetermined release condition.

7. The method of claim 1, wherein selecting the network port available at the application system comprises: selecting a network port with a low workload from a plurality of network ports of the application system.

8. The method of claim 1, further comprising: instructing, according to determination that an available bandwidth of the access device accessing the application system meets a predetermined migration condition, the access device to access the application system via the communication channel.

9. The method of claim 1, wherein the application system comprises a storage system, and the method further comprises: according to determination that a service load of the storage system meets a predetermined service condition, acquiring another available network address from the network address resource pool;

selecting another network port available at the storage system; and assigning the another network address to the another network port for establishing another communication channel for accessing the application system.

10. The method of claim 1, wherein the application system comprises a storage system, and the method further comprises: according to determination that a storage space of the storage system is extended, acquiring another available network address from the network address resource pool;

selecting another network port available at the storage system; and assigning the another network address to the another network port for establishing another communication channel for accessing the application system.

11. An electronic device, comprising:

at least one processor; and a memory coupled to the at least one processor and having instructions stored therein, wherein when executed by the at least one processor, the instructions cause the device to perform actions for accessing an application system performed in the application system, wherein the application system is a storage system that contains a plurality of storage devices and that provides storage services, the actions comprising:

acquiring an available network address from a network address resource pool associated with the application system in response to a determination that a workload received at a set of network ports in the application system exceeds a threshold, wherein the set of network ports receives storage access requests directly from a plurality of access devices and provides the storage services from the application system to the plurality of access devices, wherein the workload received at the set of network ports comprises a quantity of the plurality of access devices, and wherein the network address resource pool comprises network addresses configured to be assigned to the application system;

selecting a network port available in the application system;

establishing, by the application system based on the network address and the network port, a communication channel for accessing the application system, wherein the communication channel is provided by the application system to an access device for the access device to connect directly to the application system using the network address and the network port; and responding to, according to determination that an access request for accessing the application system is received by the application system from the access device, the access request by using the communication channel.

12. The device of claim 11, wherein establishing, based on the network address and the network port, the communication channel for accessing the application system comprises:

assigning the network address to the network port for establishing the communication channel; and notifying a domain name server associated with the application system to establish an association between the application system and the network address, so that the access request from the access device that is expected to access the application system is directed to the communication channel.

13. The device of claim 11, wherein the actions further comprise: marking a status of the network address as unavailable.

14. The device of claim 13, wherein the actions further comprise:

adding the network port to the set of network ports;

selecting, according to determination that the access load at the set of network ports meets a predetermined contraction condition, a network address from a set of network addresses assigned to the set of network ports; and notifying the domain name server to disassociate the application system from the selected network address.

15. The device of claim 14, wherein the actions further comprise: marking a status of the selected network address as available.

16. The device of claim 14, wherein the actions further comprise: releasing the network port according to determination that an access load at the network port to which the selected network address is assigned meets a predetermined release condition.

17. The device of claim 11, wherein selecting the network port available at the application system comprises: selecting a network port with a low workload from a plurality of network ports of the application system.

18. The device of claim 11, wherein the actions further comprise: instructing, according to determination that an available bandwidth of the access device accessing the application system meets a predetermined migration condition, the access device to access the application system via the communication channel.

19. The device of claim 11, wherein the application system comprises a storage system, and the actions further comprise:

according to at least one of determination that a service load of the storage system meets a predetermined service condition and determination that a storage space of the storage system is extended, acquiring another available network address from the network address resource pool;

selecting another network port available at the storage system; and assigning the another network address to the another network port for establishing another communication channel for accessing the application system.

20. A computer program product having a non-transitory computer readable medium which stores a set of instructions to access an application system, wherein the application system comprises a storage system that contains a plurality of storage devices and that provides storage services; the set of instructions, when carried out by computerized circuitry, causing the computerized circuitry to perform a method of:

acquiring an available network address from a network address resource pool associated with the application system in response to a determination that a workload received at a set of network ports in the application system exceeds a threshold, wherein the set of network ports receives storage access requests directly from a plurality of access devices and provides the storage services from the application system to the plurality of access devices, wherein the workload received at the set of network ports comprises a quantity of the plurality of access devices, and wherein the network address resource pool comprises network addresses configured to be assigned to the application system;

selecting a network port available in the application system;

establishing, by the application system based on the network address and the network port, a communication channel for accessing the application system, wherein the communication channel is provided by the application system to an access device for the access device to connect directly to the application system using the network address and the network port; and responding to, according to determination that an access request for accessing the application system is received by the application system from the access device, the access request by using the communication channel.

21. The method of claim 1, wherein the workload received at the set of network ports further comprises a data transmission volume related to each one of the plurality of access devices.

22. The method of claim 21, wherein the workload received at the set of network ports further comprises a bandwidth being used at the set of network ports.

* * * * *